United States Patent [19]

Ribbing et al.

[11] Patent Number: 5,075,391

[45] Date of Patent: Dec. 24, 1991

[54] PROCESS FOR IMPROVING THE QUALITY OF PPE-CONTAINING MOULDING MATERIALS

[75] Inventors: Wilfried Ribbing, Dorsten; Martin Bartmann, Recklinghausen, both of Fed. Rep. of Germany

[73] Assignee: Huls Aktiengesellschaft, Marl, Fed. Rep. of Germany

[21] Appl. No.: 483,307

[22] Filed: Feb. 21, 1990

Related U.S. Application Data

[63] Continuation of Ser. No. 275,631, Nov. 16, 1988, abandoned, which is a continuation of Ser. No. 75,757, Jul. 20, 1987, abandoned.

[30] Foreign Application Priority Data

Oct. 8, 1986 [DE] Fed. Rep. of Germany ....... 3634225

[51] Int. Cl.$^5$ ............................................. C07F 283/08
[52] U.S. Cl. ..................................... 525/392; 525/905
[58] Field of Search ................................. 525/392, 905

[56] References Cited

U.S. PATENT DOCUMENTS

| 3,306,874 | 2/1967 | Hay | 528/215 |
| 3,306,875 | 2/1967 | Hay | 528/215 |
| 3,356,761 | 12/1967 | Fox | 525/392 |
| 3,700,630 | 10/1972 | Hamada et al. | 525/392 |
| 3,929,930 | 12/1975 | Izawa et al. | 525/392 |
| 4,287,321 | 9/1981 | Olander | 525/392 |

Primary Examiner—Jacob Ziegler
Attorney, Agent, or Firm—Oblon, Spivak, McClelland, Maier & Neustadt

[57] ABSTRACT

A process for the preparation of PPE and/or PPE-containing moulding materials. Styrene or a styrene derivative is added to the organic PPE solution in order to improve the color quality.

5 Claims, No Drawings

PROCESS FOR IMPROVING THE QUALITY OF PPE-CONTAINING MOULDING MATERIALS

This application is a continuation of application Ser. No. 07/275,631, filed Nov. 16, 1988, which is a continuation of application Ser. No. 07/075,757, filed July 20, 1987, both now abandoned.

BACKGROUND OF THE INVENTION

2. Field of the Invention

The invention relates to a process for improving the color quality of moulding materials, which contain polyphenylene ether (PPE).

2. Discussion of the Background

It is well known that polyphenylene ether (PPE) is very sensitive to thermal stress. Even in the presence of oxygen, this sensitivity is evident in the formation of products that have a very dark color. Apparently these products are formed from the initial products, having quinonoid structures. These products are the by-products of the polycondensation of o,o-disubstituted phenols. Naturally contaminating by-products of all kinds effect to a considerable degree the color quality of PPE and PPE-containing moulding materials. This problem is very important if the PPE is not isolated by means of precipitation with a so-called anti-solvent but rather is worked up according to a so-called direct isolation process, which from the point of view of the process is more advantageous. In such a process, the catalyst components and by-products of the reaction such as diphenoquinone, which accumulate in the solution following the oxidative coupling reaction, are removed from the polymer; the solvent is removed to a large degree by distillation; and the remaining volatile components are removed from the material to a large degree in a extruder or a device which has a similar effect, and if necessary other polymer components, flame retardants, and other additives may be added.

Japanese patent application 70/40551 describes a process for stabilizing PPE with respect to thermal oxidation in which the OH end groups of PPE are reacted with styrene derivatives in the presence of basic compounds. This process has many disadvantages.

(a) Considerable quantities of monomeric styrene are required. After the PPE has been treated, the styrene derivatives that have not undergone reaction must be reisolated.

(b) If the PPE were to be subjected to further treatment following the direct isolation process, the result would be a polymerization of the monomeric styrene. The result would be polymer mixtures, having a very low thermal dimensional stability due to their high styrene content.

(c) The necessary addition of alkali compounds, p-benzoquinone, and piperazine is expensive.

JP-OS 71/02837 discloses that the end groups of the PPE can be reacted with acrylamides in the presence of basic compounds in order to shield the PPE from decomposition due to oxidation. Despite this fact, even in such masked polyphenylene ethers, thermal stress will result in unsatisfactory color changes. Thus one must assume that the observed reactions are not restricted to the end groups of PPE.

The addition of 0.1 to 6 percent by weight of organic phosphites as stabilizers is well known from the DE-PS 16 94 258. The effect of such stabilizers is that the PPE is not harmed by oxidation when the powder or the granulate undergoes further processing.

It has been proposed that chelating agents and other stabilizers such as, e.g., bivalent phenols and reducing agents (see DE-OS 27 54 887 and DE-PS 26 16 746) or aromatic amines (see DE-OS 27 55 937) be added. Whereas the chelating agents are supposed to alleviate the negative effects of residues of the metallic catalyst in the product, the object of the reducing agents is to convert colored quinones. These solutions are unsatisfactory, since the additives are often needed in large concentrations. In addition to this, it is also more difficult to isolate the polyphenylene ethers. In particular, with these techniques no color stability can be obtained at higher temperatures.

Another problem is that PPE alone and mixtures with syrene polymerizates tend to increase their molecular weight during the extrusion and the injection moulding process. This is unfavorable, since the flow properties of the polymer decline and during extrusion higher temperatures are required (see EP-OS 0 121 974, page 1). In order to obviate this, it has been proposed that a solid non-aromatic diene or dienophile be added to the polymer mixture.

According to DE-OS 24 30 130, the oxidative coupling reaction of monomeric phenols continues even after the actual reaction has been stopped. Thus on the one hand, a "zipper-like depolymerization reaction" occurs; and on the other hand, a cross-linking reaction occurs. The latter is the result of the hydrogen atoms at the alpha carbon atom splitting off from the side chain and active methylene groups being formed. These reactions also take place when the catalyst is inactive. Following the simultaneous treatment of PPE with bivalent phenol or benzoquinone and a mild reducing agent such as hydrazine, one observes that the molecular weight drops noticeably (see DE-PS 24 30 130). Thus in this manner it is possible to obtain a PPE, having a reproduceable molecular weight, following the oxidative coupling reaction. However, the problems that occur during extrusion are not solved in this fashion.

It is also known from the Japanese patent application 71/32427 that PPE can be stabilized by the addition of styrene in the presence of Bronsted acids.

Another process which is described in Japanese patent application 73/12197 discloses styrene polymerized in the presence of PPE and a radical initiator. In particular, the product is supposed to be heat resistant and to show resistance to chemical effects.

According to the data of the Japanese patent application 72/105414, graft copolymers, which are prepared in the presence of PPE and a radical initiator by means of polymerization of styrene, supposedly have an improved color quality. The last two processes have the drawback that they can be added only to mixtures that have a high content of polystyrenes.

The process of DE-OS 20 57 107 describes the grafting of styrene on PPE at a temperature ranging from 40° to 150° C. in the presence of a peroxide and water.

SUMMARY OF THE INVENTION

Accordingly, one object of the present invention is to provide a process for the preparation of PPE or PPE-containing moulding materials, in which the discolorations due to heating are prevented.

Another object is to provide a process which prevents product discolorations and in which the PPE is prepared by a direct isolation process.

Still another object of the invention is to provide a process which produces PPE materials which are not discolored and yet have relatively high notch impact strength.

These and other objects which will become apparent from the following specification have been achieved by the present process for the preparation of a polyphenylene ether or a polyphenylene ether-containing moulding material with improved color quality, comprising the steps of: (i) preparing a solution of a polyphenylene ether in an organic solvent; and (ii) adding to the solution 0.5–5 weight percent based on the polyphenylene ether, of a styrene compound of the formula

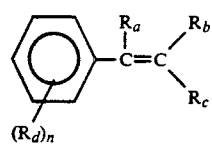

wherein $R_a$, $R_b$ and $R_c$ are, independently, hydrogen or a $C_{1-3}$ alkyl group with the proviso that the sum of the number of carbon atoms in $R_a$, $R_b$ and $R_c$ may not exceed 3; n is 0, 1, 2 or 3; and Rd is at least one member selected from the group consisting of $C_{1-6}$ alkyl, CN, halogen, $NH_2$, COOH, and aryl groups substituted with at least one $C_{1-6}$ alkyl group prior to heating the solution to a temperature above about 100° C.

DETAILED DESCRIPTION OF THE PREFERRED EMBODIMENTS

The thermal treatment of PPE and PPE-containing material, which has been preferably obtained by the direct isolation process results in discolorations, which are based on a reaction of the quinonoid compounds, in particular diphenoquinone, in heat. They should be converted to a form in which they do not yield colored products even after heating. This effect, which can occur at 140° C. and below and is quite distinct at temperatures over 200° C., is undesired. According to the state of the art, temperatures above 240° C. are usually required for producing PPE and PPE-containing moulding materials.

PPE, which is prepared according to the direct isolation process or by processing a precipitated powder, tends to increase its molecular weight at higher temperatures. This has a negative effect, in particular during extrusion and injection moulding, since the flow properties decline at the same time. In addition to this, it has a negative effect on the mechanical properties, such as, e.g., the notch impact strength.

In commercial applications one is interested in obtaining a PPE material which under the given conditions is relatively easy to process and has relatively high notch impact strength.

It was found that PPE and/or PPE-containing moulding materials of improved color quality can be obtained if styrene and/or a styrene derivative in quantities of 0.5 to 5 weight percent with respect to the PPE is added to the PPE, which is preferably available as an organic PPE solution, and the mixture is then treated in the conventional manner. At the same time the object is to stabilize the molecular weight of the PPE, which increases due to the heat. Both the pure PPE and, in particular, mixtures with impact strength modifying agents, such as, e.g., polyoctenylenes, show improved notch impact strength values.

Presumably the effect of the styrene addition is based on the fact that styrene reacts with the quinonoid structures of the minor constituents. In the case of styrene and diphenoquinone the stereo-specific formation of the following adduct was demonstrated:

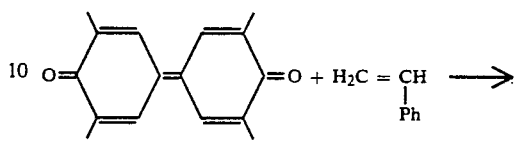

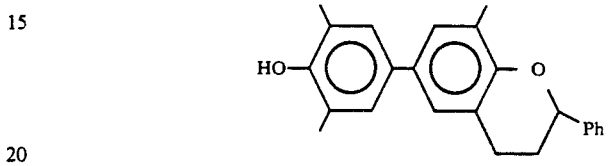

It should be noted that under these reaction conditions, the formation of the isomeric adduct

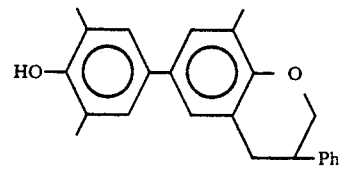

is not observed.

Excess styrene, which has not undergone reaction, is of no consequence. In any event the major portion is removed together with the solvent during processing. The presence of small quantities of polymerized styrene does not present a problem because the conventional PPE-containing moulding materials contain polystyrene in any event.

Another advantageous factor is that by adding the liquid styrene or styrene derivative to the PPE solution, a homogeneous mixture can be obtained.

Those skilled in the art are aware of processes for the oxidative coupling of phenols. Suitable phenols have the formula shown below:

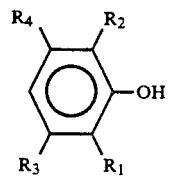

where $R_3$, $R_4$ = H, or $CH_3$ and in which $R_1$ and $R_2$ either stand for n- or i-alkyl groups, having 1 to 6 carbon atoms, or $R_1$ stands for hydrogen and $R_2$ stands for a tertiary alkyl group, having 4 to 6 carbon atoms (see German patent application P 36 17 18.7 "Process for the Preparation of Polyphenylene Ethers", DE-OS 32 24 692 and DE-OS 32 24 691 and the literature cited therein). 2,6-Dimethylphenol is preferably added. Preferably the reaction is carried out in the presence of a copper amine catalyst and, if desired, an activator.

The oxidative coupling reaction can be stopped in many ways and the polymers purified of the contaminants (see for example DE-OS 33 32 377, DE-OS 34 19 601 and DE-OS 34 42 141).

Usually the catalyst complex is inactivated by the addition of an aqueous acid, such as, e.g., diluted acetic acid or carbonic acid and water. Following the addition of these reagents, two phases form of which the upper phase contains the PPE and the contaminants.

After quenching the reaction and work up, an organic solution of approximately 5 to 25 percent by weight of PPE is obtained.

The usual organic solvents, in which the PPE accumulates, include in particular aromatic hydrocarbons such as, e.g., toluene or xylene, and their mixtures with lower alcohols such as methanol, ethanol, etc. or chlorinated hydrocarbons such as chloroform, etc.

Preferred styrene derivatives have the formula shown below.

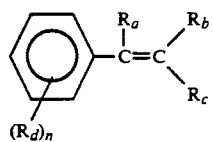

In this formula $R_a$, $R_b$, $R_c$ are, independently, hydrogen or a methyl, ethyl, n-or i-propyl group with the restriction that the sum of the number of carbon atoms of the three $R_a$, $R_b$ and $R_c$ groups may not exceed 3. Preferably $R_b$ and $R_c$ are hydrogen, and $R_a$ is also hydrogen or a methyl group, n is 3, 2, 1 or preferably 0. $R_d$ is an alkyl group, having 1 to 6 carbon atoms, a halogen such as, e.g., chlorine or bromine, a cyano or amino group, a carboxyl group or a $C_{1-6}$ alkyl substituted aryl group, if desired. When n is 2 or 3, more than one type of $R_d$ group may be present.

The total quantity of styrene and/or the styrene derivative ranges from 0.5 to 5 percent by weight, with respect to the available PPE.

Preferably an organic PPE solution is treated with the styrene or a styrene derivative. Any further treatment according to the direct isolation process, requires the use of higher temperatures in order to isolate the PPE from the solvent. A process for increasing the concentration of the PPE solutions is described in the German patent application P 36 00 754.4 of Jan. 14, 1986. In the present process the styrene must be added in each case before the PPE is heated above 100° C., preferably above 150° C.

Usually small residual quantities of solvents are removed in an extruder. During this process the temperatures can rise to 240° C. and more. Usually pure PPE is not isolated in the industrial application. Rather polystyrene is added to either the diluted or concentrated PPE solution or to the PPE melt in order to improve the flow properties (see. DE-OS 33 37 629 and German Patent application P 36 03 798). It is also possible to add to the PPE other polymers such as, e.g., polyolefins, polyamides, styrene polymerizates, which have been modified for impact strength, as is well known from the literature.

According to the process of the invention, products may be obtained that on the one hand are easier to process since they have better flow properties, and better mechanical properties, e.g., higher notch impact strength; and on the other hand, are less discolored than comparable products, which were not treated according to the process.

Other features of the invention will become apparent during the course of the following descriptions of exemplary embodiments which are given for illustration of the invention and are not intended to be limiting thereof.

EXAMPLES

Example 1

A solution of 1.5 g $CuCl_2 \cdot H_2O$ in 20 g methanol in a 3 liter reactor is added to a mixture, comprising 1300 g toluene, 177 g methanol, 30 g morpholine, and 1.5 g N,N'-di-tert-butyl ethylenediamine at 30° C. under stirring (750 U/min) and under nitrogen (100 l/h). After 5 minutes the addition of nitrogen is replaced by an air stream of 100 l/h; and a solution, comprising 150 g of 2,6-dimethylphenol in 150 g toluene is added dropwise over a period of 30 minutes. After 55 minutes the air stream is reduced to 40 l/h. Fifteen minutes later the polycondensation is stopped in that no more air is added. After adding 425 ml of water, $CO_2$ (200 l/h) is introduced until the exothermic reaction has ceased. Then the phases are separated, 5 g of styrene are added to the organic phase, the organic phase is extracted twice with 70° C. hot water, the organic phase is isolated, and the concentration of solids is increased by distillation at normal pressure to 50 percent by weight. In order to check the stabilizing effect against thermal stress, the cooled, solid substances are heated in a stainless steel autoclave for 30 minutes to 300° C. After cooling, the J value of the PPE is determined in the conventional manner; and the color of a 5% PPE solution is evaluated by means of comparison in chloroform (See Table 1).

Example 2

The procedure is analogous to Example 1. However, styrene is added first after the concentration of solids in the solution has reached a value of 50 percent by weight.

Comparison Example A

The procedure is analogous to Example 1. However, the addition of styrene is omitted.

TABLE 1

| Example Number | J-value ($cm^3/g$) after | | Color |
|---|---|---|---|
| | Polycondensation | Heating to 300° C. | |
| 1 | 57 | 59 | light |
| 2 | 54 | 56 | light |
| A | 56 | 72 | dark |

Example 3 and Comparison Test B

Analogous to the process as described in Example 1, batches of 500 kg of PPE are prepared on a larger scale and 15 kg of styrene is added to the organic solution of PPE in toluene after extraction with water. Following increased concentration of the solid content to 50%, according to the direct isolation process, described in patent application P 35 03 798.2, the solution was worked up to 100% PPE. The color, the viscosity of the solution (J-value), the viscosity of the melt (as melt index=MFI value), and the notch impact strength were evaluated.

TABLE 2

| Example Number | J-value (cm³g) after Polycondensation | J-value (cm³g) after Work up to 100% PPE | MFI (g/10 min) at 300° C./211 N | Notch Impact Strength according to DIN 53 453 (kJ/m²) | Color |
|---|---|---|---|---|---|
| 3 | 55 | 58 | 20 | 4.8 | light brown |
| B | 55 | 71 | 6 | 3.9 | dark brown |

Example 4 and Comparison Test C

These examples correspond to Examples 3 and B except for the one difference that 10%, with respect to the PPE, polyoctenylene is mixed in the PPE melt, according to P 36 03 798.2.

TABLE 2

| Example Number | J-value (cm³g) after polycondensation | MFI (g/10 min) according to DIN 53 735 at 300° C./211 N | Notch Impact Strength DIN 53 453 (kJ/m²) | Color |
|---|---|---|---|---|
| 4 | 55 | 16 | 31 | beige |
| C | 55 | 6 | 23 | brown |

Obviously, numerous modifications and variations of the present invention are possible in light of the above teachings. It is therefore to be understood that within the scope of the appended claims, the invention may be practiced otherwise than as specifically described herein.

What is claimed is:

1. A process for preparing of a polyphenylene ether or a polyphenylene ether-containing molding material with improved color quality by a direct isolation process, comprising the steps of:
   (i) preparing by an oxidative coupling reaction a solution consisting essentially of a polyphenylene ether in an organic solvent; and subsequently
   (ii) adding to said solution 0.05-5 weight percent based on said polyphenylene ether of a styrene compound of the formula

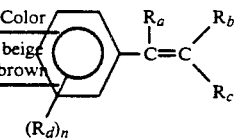

wherein $R_a$, $R_b$ and $R_c$ are independently, hydrogen or $C_{1-3}$ alkyl, with the proviso that the sum of the number of carbon atoms in $R_a$, $R_b$ and $R_c$ is not more than 3; n is 0, 1, 2 or 3; and $R_d$ is at least one member selected from the group consisting of $C_{1-6}$ alkyl, CN, halogen, $NH_2$, COOH, and $C_{1-6}$ alkyl substituted aryl groups, and heating said solution consisting essentially of said polyphenylene ether and said styrene compound in said organic solvent to a temperature above about 100° C., wherein said styrene compound reacts essentially with the coloring material in said polyphenylene ether or polyphenylene-ether containing molding material.

2. The process of claim 1, wherein $R_a$ is hydrogen or methyl; $R_b$, $R_c$ and $R_d$ are hydrogen, and n is 0 or 1.

3. The process of claim 1, wherein said organic solvent is selected from the group consisting of aromatic hydrocarbons, mixtures of aromatic hydrocarbons with lower alcohols, and mixtures of aromatic hydrocarbons with chlorinated hydrocarbons.

4. The process of claim 3, wherein said aromatic hydrocarbon is toluene or xylene.

5. The process of claim 1, wherein said styrene compound is added prior to heating said solution to a temperature above about 150° C.

* * * * *